United States Patent [19]

Nix

[11] Patent Number: 4,926,363

[45] Date of Patent: May 15, 1990

[54] MODULAR TEST STRUCTURE FOR SINGLE CHIP DIGITAL EXCHANGE CONTROLLER

[75] Inventor: Michael A. Nix, Austin, Tex.

[73] Assignee: Advanced Micro Devices, Inc., Sunnyvale, Calif.

[21] Appl. No.: 251,309

[22] Filed: Sep. 30, 1988

[51] Int. Cl.⁵ .............................................. G06F 11/00
[52] U.S. Cl. .................................. 364/579; 364/580; 364/900; 371/27; 371/20.1; 324/73.1
[58] Field of Search ............... 364/580, 579, 200, 900, 364/578; 371/20, 16, 27; 324/73 AT

[56] References Cited

U.S. PATENT DOCUMENTS

| | | | |
|---|---|---|---|
| 4,069,510 | 1/1978 | Carlow et al. | 364/200 |
| 4,393,498 | 7/1983 | Jackson et al. | 371/20 |
| 4,402,055 | 8/1983 | Lloyd et al. | 364/580 |
| 4,656,632 | 4/1987 | Jackson | 364/580 |
| 4,706,186 | 11/1987 | Mogi et al. | 364/579 |
| 4,718,064 | 1/1988 | Edwards et al. | 371/20 |

*Primary Examiner*—Parshotam S. Lall
*Assistant Examiner*—V. N. Trans

[57] ABSTRACT

A modular test structure for performing testing on a single chip having a plurality of different functional blocks is provided which includes test interface logic circuitry (24) formed on each of the functional blocks (16-22) so that each block can be operated as a self-contained module. Test generation logic circuitry (40) is formed in a bus interface unit (12) and is used to select one or more of the functional blocks (16-22) for testing and for placing the selected functional blocks (16-22) in a test mode. The test interface logic circuitry (24) on the selected functional blocks under test sends data direction information to the bus interface unit (12) to indicate how individual bits of a data bus are to be used for inputs and outputs during testing.

9 Claims, 6 Drawing Sheets

MODULAR TEST STRUCTURE FOR SINGLE CHIP DIGITAL EXCHANGE CONTROLLER

BACKGROUND OF THE INVENTION

This invention relates generally to digital integrated circuits and more particularly, it relates to a modular test structure for a single chip digital exchange controller (DEC) system.

As is generally known, present functional, or logic, circuitry may be quite complex due to the advent of large scale integration (LSI) wherein a very large number of semiconductor circuits are fabricated on a single chip. When the functional circuitry are desired to be made more powerful and flexible, the greater the complexity of the resulting single chip becomes. However, with such increasing complexity comes increased cost in fabrication and in testing. The entire chip may be found to be unusable due to a single flaw in its fabrication. Therefore, it is important to verify the performance of functional circuitry during assembly and also subsequently during use on a periodic basis.

Prior art digital exchange controller (DEC) systems generally have included a variety of functional blocks in which each block contains a large number of digital circuits capable of performing different logic operations. For example, such functional blocks on the DEC system may include a data link controller block, a time slot assigner block, a line interface unit block, and a multiplexer block. Each of these functional blocks are dedicated to specific functions and require specific hardware, control signals and associated interconnections for their operation. Therefore, it can be seen that the diagnostic testing of LSI DEC system chips having complex circuitry and interconnections is a very time consuming process since there are thousands and thousands of possible operating states for the high density functional blocks.

One such common prior art method uses multiplexer test interface circuitry to route testing signals from an outside diagnostic or testing equipment to input pins/nodes of the functional blocks under test and to route logic states from output pins/nodes of the functional block to the testing equipment. However, the multiplexer test interface circuitry determines which ones of the nodes on the particular functional block are to be used as inputs and which ones of the nodes are to be used as outputs. As a result, when one of the particular functional blocks on the DEC system is desired to be replaced with a different functional block the multiplexer test interface circuitry would be required to be redesigned so as to accommodate testing of the new block.

It would therefore be desirable to provide a modular test structure for a single chip DEC system in which the various functional blocks may be changed without requiring a redesign of the multiplexer test interface circuitry. This is accomplished in the present invention by providing unique test interface logic circuitry on each functional block of the DEC system chip so that every block can be operated as a self-contained module. Further, specially-designed test generation logic circuitry is formed on a bus interface unit section and is used to select one or more of the functional blocks to be tested via a microprocessor-controlled tester. The test interface logic circuitry of the selected functional blocks under test sends data direction information to the bus interface unit section to indicate how individual data bits are to be used for inputs and outputs during tests. As a result, effective and efficient testing of the different functional blocks can be accomplished by the implementation of microprogram software in the tester rather than requiring redesign of hardware on the bus interface unit section.

SUMMARY OF THE INVENTION

Accordingly, it is a general object of the present invention to provide a modular test structure for performing testing on a single chip DEC system having a plurality of different functional blocks on an efficient and effective basis.

It is an object of the present invention to provide a modular test structure which includes test interface logic circuitry formed on each functional block of a DEC system so that each block can be operated as a self-contained module.

It is another object of the present invention to provide test generation logic circuitry formed on a bus interface unit section for placing functional blocks in a test mode and test interface logic circuitry formed on each functional block under test for sending data direction information to the bus interface unit section to indicate how individual data bits are to be used for inputs and outputs during tests.

It is still another object of the present invention to provide a modular test structure for performing testing on a single chip DEC system having a plurality of different functional blocks which includes interrupt circuitry for temporarily interrupting testing of a selected functional block so as to allow reading and writing of registers in other functional blocks.

In accordance with these aims and objectives, the present invention is concerned with the provision of a modular test structure for performing testing on a single chip DEC digital system having a plurality of different functional blocks which includes a bus interface unit portion and a DEC portion. The DEC portion includes a variety of functional blocks which are to be tested. Each of the functional blocks includes a test interface logic circuitry section so as to form a self-contained module. The bus interface unit portion communicates with a microprocessor-controlled diagnostic or testing equipment located on another I.C. chip via bidirectional data bus, address bus and control signals and is used to place one or more of the functional blocks in the test mode. The test interface logic circuitry section on the selected functional blocks under test sends data direction information to the bus interface unit portion to indicate how individual data bits are to be used for inputs and outputs during tests. The testing of the selected functional blocks can be interrupted temporarily so as to allow reading and writing of registers in the functional blocks under test or to other functional blocks.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIGS. 5(a)–5(t) are a set of waveform diagrams useful for understanding the operation of the modular test structure in FIG. 1.

DESCRIPTION OF THE PREFERRED EMBODIMENT

Figure 1:
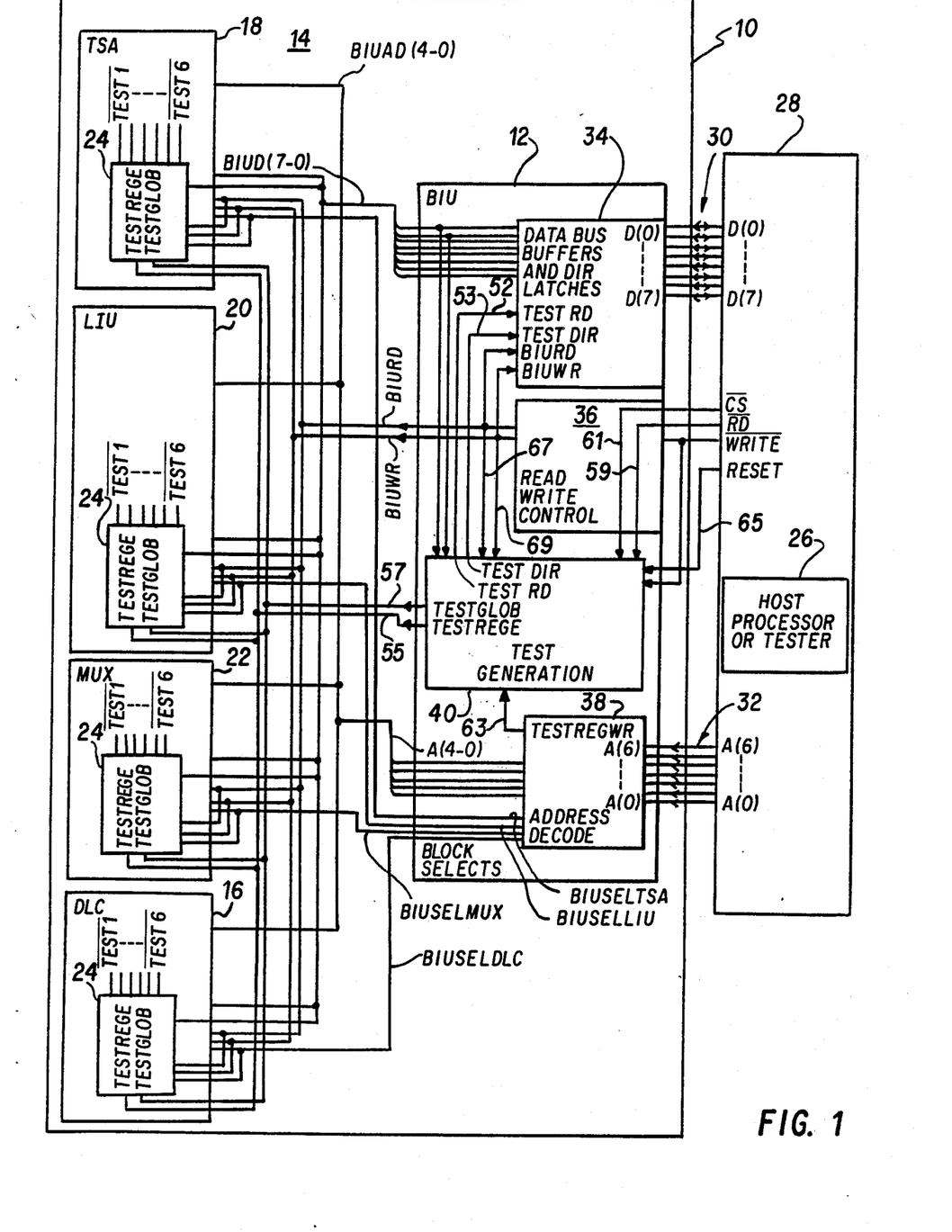
FIG. 1 is a block diagram of a modular test structure, constructed in accordance with the principles of the present invention.

Referring now in detail to the drawings, there is shown in FIG. 1 a block diagram of the organization of a modular test structure of the present invention for a single chip structure of the present invention for a single chip DEC digital system. As can be seen, the single chip 10 is fabricated through a LSI technique and includes a microprocessor or bus interface unit (BIU) portion 12 and a DEC portion 14. The DEC portion 14 includes a variety of functional blocks 16, 18, 20 and 22 which are to be tested. For example, the functional block 16 may be a data link controller (DLC) block; the functional block 18 may be a time slot assigner (TSA) block; the functional block 20 may be a line interface unit (LIU) block; and the functional block 22 may be a multiplexer (MUX) block. Each of the functional blocks 16–22 includes a test interface logic circuitry section 24 so as to form a self-contained module.

The BIU portion 12 communicates with a microprocessor-controlled diagnostic or testing equipment 26 located on another I.C. chip 28 via bidirectional data bus 30, address bus 32, and control signals $\overline{READ}$, $\overline{WRITE}$, $\overline{CS}$ and RESET. The data bus 30 or D(7-0) consists of eight individual bits D(0), D(1), ... D(7). The address bus 32 or A(6-0) consists of seven individual bits A(0), A(1), ... A(6). The BIU portion 12 includes I/O circuitry section 34, read/write control circuitry section 36, address decoder circuitry section 38, and a test generation logic circuitry section 40.

Figure 3:
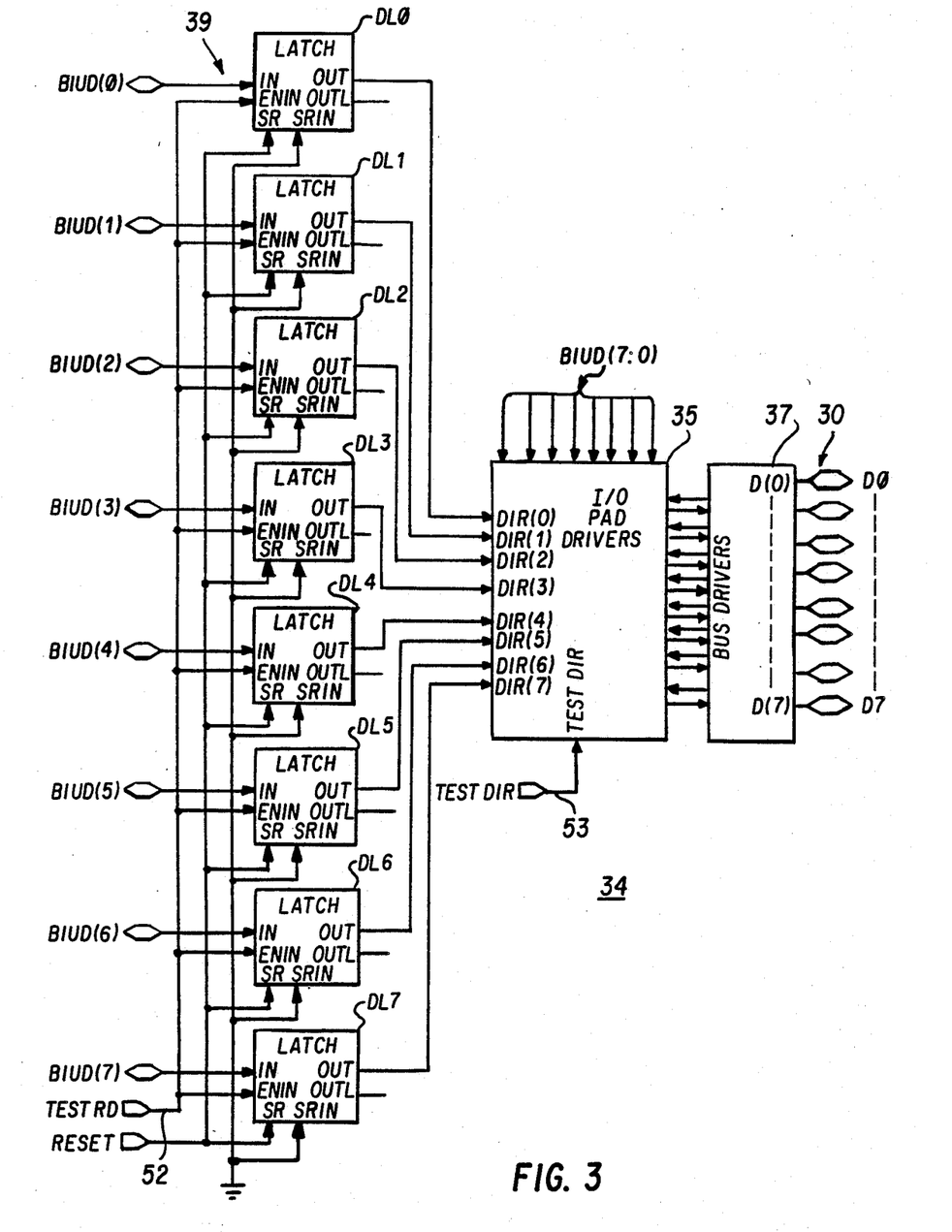
FIG. 3 is a schematic circuit diagram of the data direction latches in the I/O circuitry section of the bus interface unit of FIG. 1.

The I/O circuitry section 34 is formed of I/O pad drivers 35, data bus buffers 37, and directional information latches or register 39 (FIG. 3). The data bus buffers 37 are used to interconnect the data bus 30 with a bidirectional internal data bus BIUD(7:0) which is formed of individual bits BIUD(0), ... BIUD(7). The internal data bus BIUD(7:0) is supplied to each of the functional blocks 16–22 as well as to each test interface test logic circuitry section 24 located on the respective functional blocks. The read/write control circuitry section 36 receives as inputs the control signals, $\overline{READ}$, $\overline{WRITE}$, and $\overline{CS}$ and generates as outputs (1) an internal register read signal BIURD, and (2) an internal register write signal BIUWR. The internal read and write signals are likewise supplied to each of the functional blocks 16–22 as well as to each test interface logic circuitry section 24 located on the respective functional blocks so as to allow reading and writing in all of the registers. It should also be understood that the read/write control circuitry section 36 receives a chip reset signal RESET which is sent to the functional blocks 16–22, the test interface logic circuitry section 24, and the test generation logic circuitry section 40.

The address decode circuitry section 38 decodes the higher two bits A(5) and A(6) in the address bus A(6-0) so as to generate block select signals BIUSELDLC, BIUSELTSA, BIUSELLIU, and BIUSELMUX. The block select signals are used to select a particular functional block for testing. The other five bits A(4-0) are supplied to a bidirectional internal address bus BIUAD(4-0) which is formed of individual bits BIUAD(0), ... BIUAD(4). The address decoder circuitry section 38 also generates a test register write signal TESTREGWRI by decoding a selected combination of the seven address bits A(6-0). The internal address bus BIUAD(4-0) is supplied to each of the functional blocks 16–22.

The test generation logic circuitry section 40 receives as inputs the following: (1) the control read signal $\overline{READ}$, (2) the internal register read signal BIURD, (3) the internal register write signal BIUWR, (4) the test register write signal TESTREGWRI, and (5) the two lower bits BIUD(0) and BIUD(1) of the internal data bus 30. The test generation logic circuitry section 40 generates as outputs: (1) a block test register access enable signal TESTREGE, (2) a chip test activation signal TESTGLOB, (3) a test read signal TESTRD, (4) a test direction signal TESTDIR.

The modular test structure of the present invention is comprised of the plurality of test interface logic circuitry sections 24 located on the various functional blocks 16–22 in the DEC portion 14 and the test generation logic circuitry section 40 with associated circuitry located on the BIU portion 12. The microprocessor-controlled tester 26 can transmit test signals to the functional block or blocks under test and receive data signals from the functional block or blocks under test via the bus interface unit portion 12. The BIU portion 12 communicates with the various functional blocks via bidirectional internal data bus BIUD(7-0) and bidirectional internal address bus BIUAD(4-0).

The test generation logic circuitry section 40 is used to control or determine which one or more of the functional blocks 16–22 are to be tested by placing the same in a test mode. The test interface logic circuitry section 24 on the selected functional block to be tested transmits data direction information to the I/O circuitry section 34 of the BIU portion 12 indicating how the individual data bits BIUD(0), ... BIUD(7) are to be used as inputs and outputs during testing. The data direction information is stored in the direction information latches 39 in the I/O circuitry section 34 which modifies the data bus buffers 37 based upon this information during testing. As a result, the I/O pad drivers 35 drive in the direction indicated by the data direction information latches 39.

Figure 2:
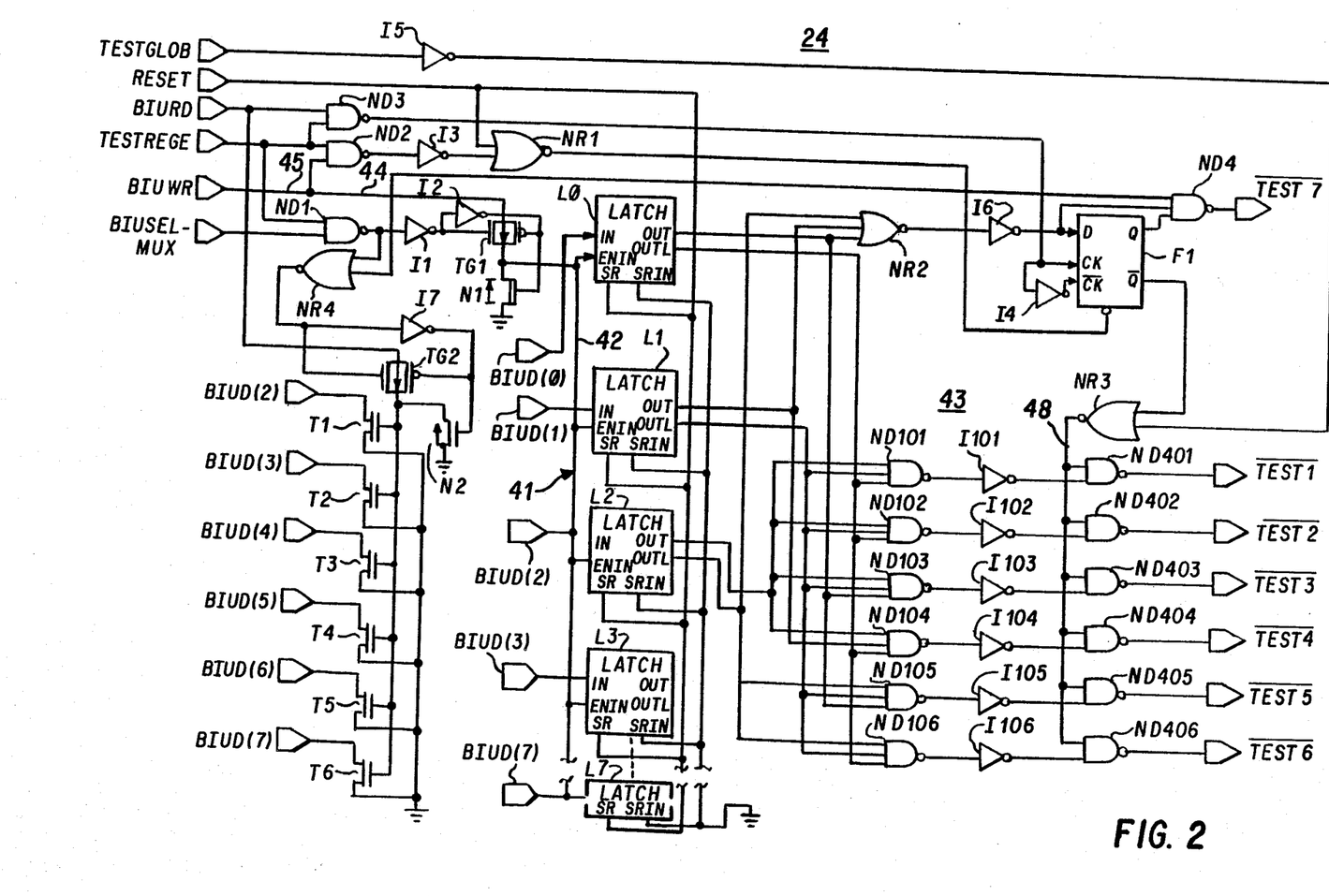
FIG. 2 is a schematic circuit diagram of the test interface logic circuitry for use in the modular test structure for testing the functional blocks of FIG. 1.

Since each of the test interface logic circuitry sections 24 on the various functional blocks 16–22 may all be quite similar in construction, it will be sufficient to show one implementation of the test interface logic circuitry section. It should be apparent to those skilled in the art that other implementations are certainly possible. Accordingly, a schematic circuit diagram of the test interface logic circuitry section 24 located on the multiplexer (MUX) functional block 22 is illustrated in FIG. 2. As can be seen, the MUX test interface logic circuitry section 24 receives as inputs the following control signals: (1) the internal register read signal BIURD, (2) the internal register write signal BIUWR, (3) the block select signal BIUSELMUX, (4) the chip reset signal RESET, (5) the block test register access enable signal TESTREGE, and (6) the chip test activation signal TESTGLOB. The MUX test interface logic circuitry section 24 transmits as outputs the various internal test block signals $\overline{TEST1}$, $\overline{TEST2}$, ... $\overline{TEST6}$. Certain circuit components of the interface logic section 24 also interconnect with and communicate with the BIU portion 12 over the bidirectional internal data bus BIUD(7:0).

The MUX test interface logic circuitry section 24 includes a test register 41 formed of eight individual-bit latches L0–L7 and a test decoder 43. Since the test register 41 can store a binary "1" to a binary "255" on its outputs Q0, ... Q7, this allows up to 255 different tests to be performed on the multiplexer functional block 22. When all of the outputs of the test register are in the zero state, this indicates a no test mode condition. As can be seen, the reset node R of each of the latches L0–L7 is connected to receive the chip reset signal RESET. When the reset signal is active (high or logic "1"), the outputs Q0 ... Q7 are all cleared to a zero state so as to take the multiplexer functional block 22 out of the test mode. The latch enable node $\overline{L}$ of each latch is connected to a control signal C1 on line 42. The data input nodes D0 ... D7 of the respective latches L0 ... L7 are connected to receive data from the corresponding individual bits BIUD(0) ... BIUD(7) of the internal data bus BIUD(7:0). When the control signal C1 is at a high or logic "1" level, the data on the individual bits BIUD(0) ... BIUD(7) will be loaded or written into the respective latches L0 ... L7. When the control signal C1 goes to a low or logic "0" level, the loaded data will be latched at their respective outputs Q0 ... Q7.

The control signal C1 is generated from associated test circuitry 45 which includes NAND logic gate ND1; inverters I1, I2; transmission gate TG1; and an N-channel transistor N1. One input of the logic gate ND1 receives the block select signal BIUSELMUX and the other input of the logic gate ND1 receives the tests register access enable signal TESTREGE. The internal register write signal BIUWR is connected to the signal input node of the transmission gate TG1 on line 44. When the signals BIUSELMUX, TESTREGE, and BIUWR are all active (high or logic "1"), the transmission gate TG1 wil be closed so as to pass the internal register write signal BIUWR from the signal input node on line 44 to the signal output node on line 42. This write signal thus defines the control signal C1. Since the select signal BIUSELMUX is obtained from the address decoder circuitry section 38 in the BIU portion 12, the multiplexer functional block 22 is selected for tests when the proper address has been decoded.

The test decoder 43 includes a plurality of NAND logic gates ND101 ... ND106; a plurality of inverters I101 ... I106; and a plurality of two-input NAND logic gates ND401 ... ND406. The inputs to the NAND gates ND101 ... ND106 are connected from the various outputs of the latches L0 ... L7. The output of the gate ND101 will go to a low logic level only when the test register 41 has stored a binary "1." The output of the gate ND102 will go to a low logic level only when the test register 41 has stored a binary "2," and so forth. The output of the NAND gates ND101 ... ND106 are connected to respective inputs of the inverters I101 ... I106. The output of these inverters are connected as one input to the corresponding two-input NAND gates in ND401 ... ND406. The other input of the gates ND401 ... ND406 are commonly connected together to receive a test block enable signal C2 on line 48. It is only when the test block enable signal C2 is at a high level that one of the decoded test mode signals from the inverters I101 ... I106 is allowed to generate one of the corresponding internal test signals $\overline{TEST1}$, $\overline{TEST2}$, ... $\overline{TEST6}$ which is sent to the functional block 22 to be tested.

The test block enable signal C2 on the line 48 is generated from the associated test circuitry 45 which further includes NAND logic gates ND2, ND3, ND4; inverters I3, I4, I5, I6; NOR logic gates NR1, NR2, NR3; and a test enable flip-flop F1. The NAND logic gate ND2 receives on its one input the internal register write signal BIUWR and on its other input the test register enable signal TESTREGE. When both the signals BIUWR and TESTREGE are active (high or logic "1"), the test enable flip-flop F1 will be reset so that the output Q will be "0" and the output $\overline{Q}$ will be "1." Thus, the test block enable signal C2 will be low so as to prevent generation of a test signal (i.e., one of the internal test signals $\overline{TEST1}$ ... $\overline{TEST6}$). Also, the NOR logic gate NR2 and the inverter I6 are used to set the output Q to a "0" and the $\overline{Q}$ to the "1" of the flip-flop F1 if the contents of the test register 41 is a zero. Thus, the test block enable signal C2 will again be low so as to avoid generating of a test signal.

If the test register 41 has contents which are non-zero (i.e., ... 001), the output of the NAND logic gate ND101 will be low. When the signals BIUDRD, BIUSELMUX, and TESTREGE are all active (high or logic "1"), the associated test circuitry 45 formed of transmission gate TG2, NOR logic gate NR4, inverter I7, and an N-channel transistor N2 will cause a set of N-channel control transistors T1–T6 functioning as direction information drivers to turn on. This serves to pull down certain ones of the individual bits BIUD(0) ... BIUD(7) connected to the sources of the respective transistors T1–T6. Since no transistors are connected to the individual bits BIUD(0) and BIUD(1), these are left floating at a high level. The specific connection of the transistors T1–T6 determine whether the individual bits are to be used as inputs or as outputs. If a particular individual bit line is to be used as an input, the line should be pulled down to zero. This information is stored in the direction information latches or register 39 of FIG. 3. If a particular individual bit line is to be used as an output, then the line should be left floating high. It should be understood that for each of the other test modes 2 through 6, that similar direction information drivers must be included and connected to the respective decoded test mode signals from the corresponding logic gates ND102 through ND106.

Since the output $\overline{Q}$ of the test block enable flip-flop F1 is still at the high level, the control signal C2 will be low and no internal test signal will be generated. When the internal register read signal BIURD mades a high-to-low transition on its trailing edge, the output $\overline{Q}$ of the flip-flop will go to a low level. However, the test block enable signal C2 will still not go to a high level until the activation signal TESTGLOB goes high so as to generate the internal test signal (i.e., $\overline{TEST1}$).

A schematic circuit diagram of the direction information latches or register 39 (FIG. 3) in the I/O circuitry section 34 of the BIU portion 12 is illustrated in FIG. 3. The data direction register 39 consists of a plurality of data direction latches DL0 ... DL7. Again, the reset node R of each data direction latch is connected to the chip reset signal RESET. When the reset signal is active (high or logic "1"), the outputs Q0 ... Q7 corresponding to data direction control signals DIR(0) ... DIR(7) are all cleared to a zero state initially. The latch enable node $\overline{L}$ of each latch is connected to receive the test read signal TESTRD on line 52. As will be recalled, the test read signal is generated by the test generation logic circuitry section 40 (FIG. 1).

The data input nodes D0 . . . D7 of the respective direction latches DL0 . . . D7 are connected to receive direction data on the individual bits BIUD(0) . . . BIUD(7) as generated by the direction information drivers (i.e., transistors T1 through T6) located on the test interface logic circuitry section 24. When the test read signal TESTRD is active (high or logic "1") the direction data on the individual bit lines BIUD(0) . . . BIUD(7) will be loaded or written into their respective data direction latches DL0 . . . DL7. When the test read signal TESTRD goes inactive (low or logic "0"), the direction data loaded will be latched at the respective outputs Q0 . . . Q7 which are referred to as the data direction control signals DIR(7:0). These data direction control signals are formed of individual data direction control signals DIR(0) . . . DIR(7) and are sent to the I/O pad drivers 35 located in the in the I/O circuitry section 34 of the BIU portion 12. These I/O pad drivers will use these data direction control signals in response to the test direction signal TESTDIR to set the data direction of the data bus buffers 37. As will be recalled, the test direction signal on line 53 (FIG. 1) is generated by the test generation logic circuitry section 40, as will be explained hereinbelow.

Figure 4:
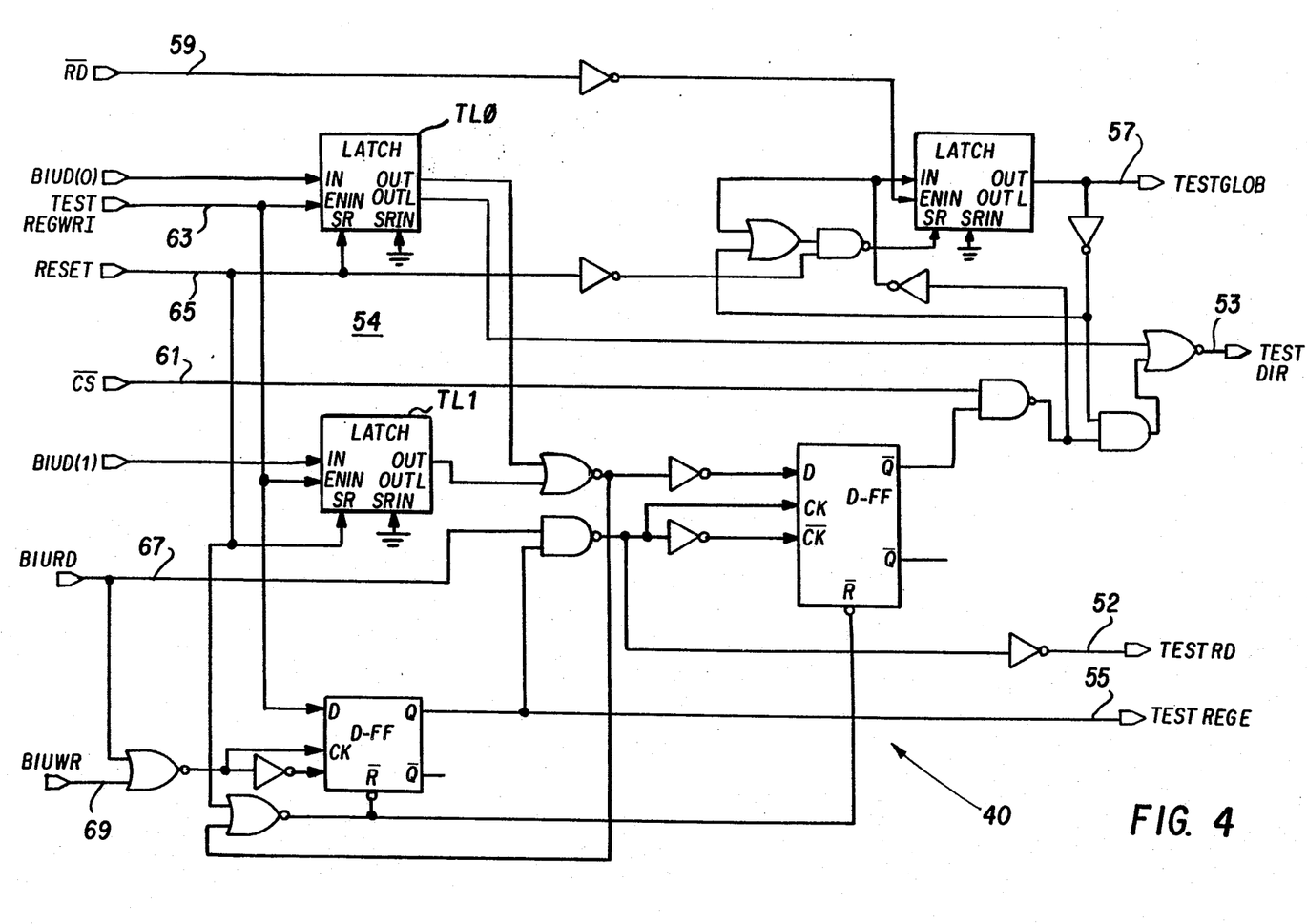
FIG. 4 is a schematic circuit diagram of the test generation logic circuitry for use in the modular test structure for testing the functional blocks of FIG. 1.

A schematic circuit diagram of the test generation logic circuitry section 40, which is located on the bus interface unit BIU portion 12, is illustrated in FIG. 4. The test generation logic circuitry section 40 is used to generate the following outputs: (1) the test register access enable signal TESTREGE on line 55, (2) the chip test activation signal TESTGLOB on line 57, (3) the test read signal TESTRD on the line 52, and (4) the test direction signal TESTDIR on the line 53. The test generation logic circuitry section 40 receives as inputs the following control signals: (1) the read signal $\overline{READ}$ on line 59 from the read/write control circuitry section 36, (2) the chip select signal $\overline{CS}$ on line 61 from the control circuitry section 36, (3) the test register write signal TESTREGWRI on the line 63 from the address decoder circuitry section 38, (4) the chip reset signal RESET on line 65 from the control circuitry section 36, (5) the internal register read signal BIURD on line 67 from the control circuitry section 36, and (6) the internal register write signal BIUWR on line 69 from the control circuitry section 36. Certain circuit components of the test generation logic circuitry section 40 also interconnect with and communicate over the individual data bit lines BIUD(0) and BIUD(1).

The test generation logic circuitry section 40 includes a two-bit register 54 formed of test latches TL0 and TL1. The data input nodes D0 and D1 of the latches TL0 and TL1 are from respective individual bit lines BIUD(0) and BIUD(1) of the internal data bus BIUD(7:0). If the outputs of the register 54 are in the zero state, the signals TESTREGE and TESTGLOB on the respective lines 55 and 57 are disabled. The reset signal RESET on the line 65 is used to set initially the register 54 to (0,0). The register 54 may be written into with the data on the individual lines BIUD(0) and BIUD(1) by application of the test register write signal TESTREGWRI on the line 63 going active (high or logic "1"). At the trailing edge of a first write signal BIUWR with the signal TESTREGWRI being at a high level, the test access enable signal TESTREGE will go active (high or logic "1").

As a result, the multiplexer functional block 22 being tested will have its test register 41 written with a non-zero value upon application of a second write signal BIUDWR. This is because the transmission gate TG1 (FIG. 2) will be closed since both signals BIUSELMUX and TESTREGE will be active. At the trailing edge of this second write signal BIUWR, the signal TESTREGE will go back to the inactive state since the signal TESTREGWRI will be at a low level. The register 54 will now be written into again with the same original non-zero data in the individual bit lines BIUD(0) and BIUD(1) by application of a second test register write signal TESTREGWRI going active. Thus, at the trailing edge of the third write signal BIUWR, the test register enable signal TESTREGE will go active again.

Next, the data direction information on the individual bits BIUD(0) . . . BIUD(7) are read and stored in the data direction register 39 (FIG. 3). This is accomplished by the application of the read signal BIURD going active which, in turn, causes the test read signal TESTRD to go active. At the trailing edge of the read signal BIURD, the test register enable signal TESTREGE will go inactive. Also, the test read signal TESTRD will be inactive causing the data direction information to be latched in the direction latches DL0 . . . DL7 of the register 39.

The trailing edge of this read signal TESTRD will cause the test direction signal TESTDIR to go active when the chip select signal $\overline{CS}$ goes inactive (high or logic "1"). This, in turn, causes the I/O pad drivers 35 to drive in the direction indicated by the data direction control signals DIR(0) . . . DIR(7) stored in the register 39. Finally, the read signal $\overline{READ}$ will go active (low or logic "0") after the chip select signal has gone inactive which causes the test activation signal TESTGLOB to go active (high or logic "1"). Consequently, the internal test signals $\overline{TEST1}$ . . . $\overline{TEST6}$ are sent to the functional block under test. Now, the microprocessor-controlled tester 26 can communicate with the multiplexer functional block 22 over the bidirectional internal data bus BIUD(7:0) for testing purposes.

A more detailed operation of the test generation logic circuitry section 40 and the test interface logic circuitry section 24 of FIGS. 1 through 4 will now be explained with reference to the waveform diagrams shown in FIGS. 5(a)–5(t), which are useful in assisting in the further understanding of this invention. It will be assumed that the multiplexer functional block 22 is the one desired to be selected for testing purposes. A timed sequence of events will now be described between the times t0 through t38.

At the time t0, addresses AD(6-0) shown in FIG. 5(e) from the tester 26 are decoded by the address decode circuitry section 38 in the BIU portion 12 so as to generate the test register write signal TESTREGWRI on the line 63, which goes active at time t1 and is illustrated in FIG. 5(f). Thereafter, the chip select signal $\overline{CS}$ and the write signal $\overline{WRITE}$ will go active at respective times t3 and t4, as is depicted in FIGS. 5(c) and 5(b). At the time t5, as shown in FIGS. 5(d) and 5(m), the data in the data bus 30 and the internal data bus BIUD(7:0) will change. At the same time t5, the internal register write signal BIUWR, as shown in FIG. 5(l), will go active. As a result, the two lower bits BIUD(0) and BIUD(1) are read into the test generation latches TL0 and TL1 of the register 54.

When the chip select signal $\overline{CS}$ and the write signal $\overline{WRITE}$ goes inactive at the time t6, the internal register write signal BIUWR will go inactive at time t7. On the trailing edge at the time t7 of the write signal BIUWR, the test register enable signal TESTREGE on the line 55 will go active, as shown in FIG. 5(g). Now, the addresses AD(6-0) will be changed at time t8. The address decoder circuitry section 38 will decode the new address so as to cause the multiplexer block select signal BIUSELMUX to go active at time t9, as shown in FIG. 5(n) and will cause the test register write signal TESTREGWRI to go inactive at time t10 as shown in FIG. 5(f).

At the respective times t11 and t12, the chip select and write signals will go active again. At time t13, the data in the data bus 30 and the internal data bus BIUD(7-0) will again change as shown in respective FIGS. 5(d) and 5(m). At this time t13, the internal write signal BIUWR will also go active so as to load data into the test register 41 of the multiplexer block 22. Next, the chip select signal $\overline{CS}$ and the write signal $\overline{WRITE}$ at the respective times t14 and t15 will go inactive again, which causes the internal write signal BIUWR to go low at time t16. The trailing edge of the internal write signal BIUWR at the time t16 causes the test register enable signal to go inactive at time t17. At time t18, the address AD(6-0) will be changed again so that the address decoder circuitry section 38 will cause the test register write signal TESTREGWRI to go active again and cause the multiplexer block select signal BIUSELMUX to go low at the respective times t19 and t20.

At the times t21a and t21b, the chip select and write signals will go active again, and at the time t22, the data in the data bus 30 will change back to the original data which was sent at the time t5. Also, at the time t22 the internal write signal BIUWR will go active so as to write the same original data into the test generation register 54. At the time t23, the chip select and write signals will now to back to the inactive state, which causes the internal write signal BIUWR to go inactive at time t24. The trailing edge of the third write signal at the time t24 will cause the test register enable signal TESTREGE to go active again.

At the time t25, the address AD(6-0) are changed again, and the address decoder circuitry section 38 decodes the same so as to cause the test register write signal to go inactive at the time t26 and to cause the multiplexer block select signal to go active at the time t27. At times t28a and t28b, the chip select signal $\overline{CS}$ in FIG. 5(c) and the read signal $\overline{READ}$ in FIG. 5(a) will go active. This causes the internal register read signal BIURD shown in FIG. 5(k) to go active at time t29. This read signal then causes the data direction drivers formed of the transistors T1-T6 to be turned on, allowing direction data to be sent to the data input nodes of the data direction latches 39 in the I/O circuitry section 34.

Figure 5A:
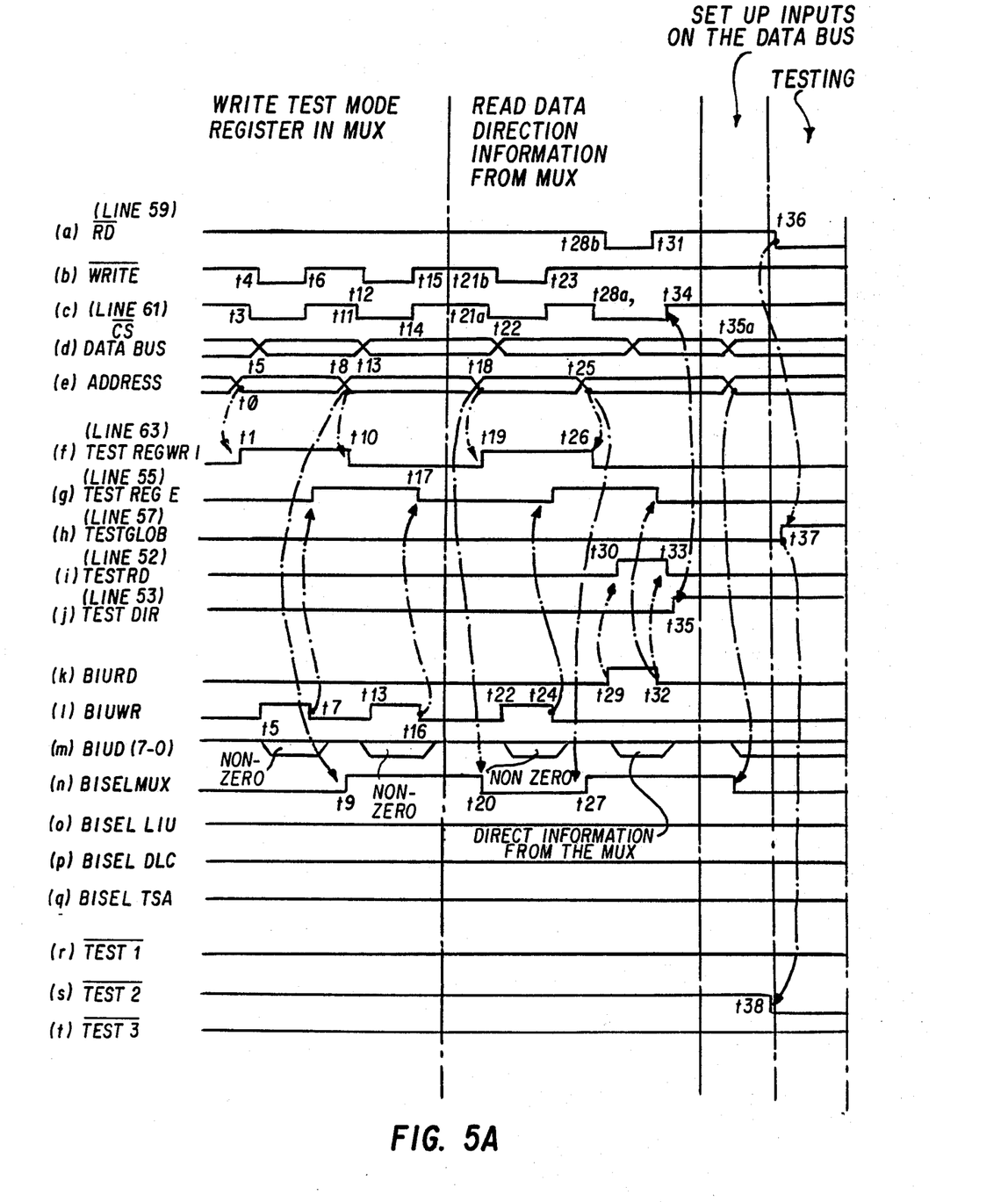
Figure 5B:
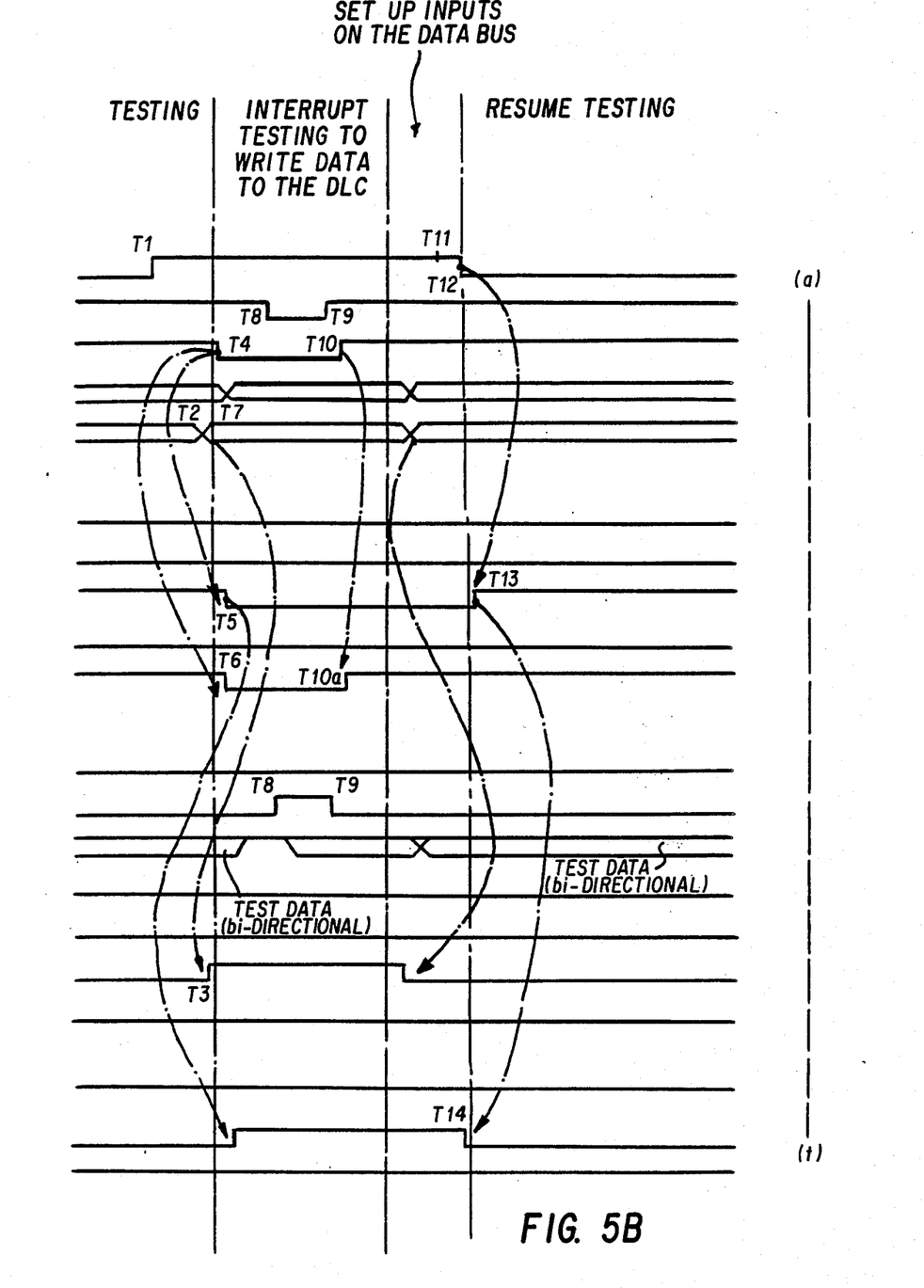

When the internal test register read signal goes high at the time t29, this also causes the test read signal TESTRD on the line 52 as shown in FIG. 5(i) to go active at time t30. Consequently, the data direction information DIR(0) . . . DIR(7) will be stored in the direction latches DL0 . . . DL7 of the register 39. When the read signal $\overline{READ}$ in FIG. 5(a) goes inactive at the time t31, this causes the internal register read signal to go inactive at time t32. This, in turn, causes the test register enable signal on the line 55 and the test read signal on the line 52 to go inactive. The trailing edge of the test read signal going inactive at the time t33 causes the data direction information DIR(0) . . . DIR(7) to be stored or latched in the latches DL0 . . . DL7.

When the chip select signal $\overline{CS}$ goes inactive at time t34, this causes the test direction signal TESTDIR on the line 53 as shown in FIG. 5(j) to go active at the time t35. As a result, the I/O pad drivers 35 drive the data bus in the direction set by the data information DIR(0) . . . DIR(7). At the time t35a, the microprocessor-controlled tester 26 is allowed to write data into the test inputs of the multiplexer functional block under test. Finally, the read signal $\overline{READ}$ goes active at the time t36 so as to cause the test activation signal TESTGLOB on the line 57 to go active at the time t37, as shown in FIG. 5(h). This, in turn, causes the internal test signal $\overline{TEST2}$ at time t38 to be generated from the test interface logic circuitry section 24, which is then adapted to be sent to the functional block under test and is illustrated in FIG. 5(s).

Once the test activation signal goes active with the read signal also being active, the tester 26 is allowed to send data to the functional block under test and to receive data from the functional block under test. It should be understood to those skilled in the art that the previously described sequence of events can be modified so as to allow testing of more than one functional block at a time. This is accomplished by writing alternately to the test generation register 54 and the test register 41 in the various blocks to be tested. Then, the internal test register read signal can be applied with the test register enable signal being active so as to load the data direction information into the direction latches DL0 . . . DL7.

At times during the process of performing a test on a certain selected functional block, it may be necessary to interrupt temporarily the testing of such functional blocks so that all internal registers can be directly read out or written into for testing purposes. This interrupting operation for the modular test structure of the present invention will now be explained with reference to the waveform diagrams in FIGS. 5(a) through 5(t). The interrupting timed sequence of events are shown between the times T1 through T14. It will be assumed that the multiplexer functional block 22 is being tested and that it is desired to interrupt such testing so as to write data into the internal registers of the DLC functional block 16. Then, the testing of the MUX functional block 22 will be resumed.

At the time T1, the read signal $\overline{READ}$ goes inactive as shown in FIG. 5(a). At the time T2, the address AD(6-0) is changed so that the address decoder circuitry section 38 causes the DLC block select signal to go active at the time T3. This is illustrated in FIG. 5(p). When the chip select signal $\overline{CS}$ goes active at the time T4, this causes the test activation signal on the line 57 and the test direction signal on the line 53 to go inactive at the respective times T5 and T6. This is illustrated in FIGS. 5(h) and 5(j). At the time T7, the data in the data bus 30 is changed. Between the times T8 and T9, the write signal and the internal register write signal are active so as to allow writing of data into the internal registers located on the DLC functional block 16.

At the time T10, the chip select signal $\overline{CS}$ goes inactive which causes the test direction signal to go active at the time T10a. Between the times T10 and T11, the address AD(6-0) is changed so as to deselect the DLC functional block 16. At this time interval between T10 and T11 where the chip select signal $\overline{CS}$ and the read signal READ are inactive, the I/O pad drivers 35 are driving the internal data bus BIUD(7:0) based upon the data information stored in the direction latch 39. This allows the internal data bus to be precharged to the proper value before putting the multiplexer functional block 22 back into the test mode so that the test inputs do not have any glitches on them. When the read signal goes active at the time T12, this will cause the test activation signal TESTGLOB on the line 57 to go active at the time T13. This, in turn, causes the internal test signal TEST2 at time T14 to be generated again and testing of the multiplexer functional block can be resumed thereafter.

From the foregoing detailed description, it can thus be seen that the present invention provides a modular test structure for a single chip DEC digital system in which the various functional blocks may be changed without requiring a redesign of the bus interface unit portion. The modular test structure of the present invention includes test interface logic circuitry section which is formed on each of the functional blocks so that each block can be operated as a self-contained module.

Further, test generation logic circuitry is formed on the bus interface unit portion which is used to select one or more of the functional blocks to be tested. The test interface logic circuitry section on the selected functional blocks under test send data direction information to the bus interface unit section to indicate how the individual data bus bits are to be used for inputs and outputs during tests. In addition, the testing may be interrupted temporarily so as to allow reading and writing to all internal registers of another functional block as well as of the functional block being tested.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A modular test structure for performing testing on a single chip having a plurality of different functional blocks comprising:

bus interface unit means (12) for communicating with a microprocessor-controlled diagnostic tester (26) via bidirectional data bus, address bus, and control signals;

said bus interface unit means (12) including I/O circuit means (34), read/write control circuit means (36), address decoder means (38), and test generation logic means (40);

each of said plurality of different functional blocks (16-22) including test interface logic means (24) for communicating with said bus interface unit means (12);

said address decoder means (38) being coupled to said address bus for generating select signals to select one or more of the functional blocks (16-22) for testing and for generating a first test register write signal to place the selected functional blocks in a test mode;

said test generation logic means (40) being coupled to receive said first test register write signal and a first write signal for generating a first test register access enable signal;

said test interface logic means (24) being coupled to receive said first test register access enable signal, said select signals and a second write signal for receiving test information from said bidirectional data bus;

said test generation logic means (40) being coupled to receive a second test register write signal and a third write signal for generating a second test register access enable signal;

said test interface logic means (24) being coupled to receive said second test register access enable signal, said select signals and a read signal for transmitting direction information to direction latch means (39) over said bidirectional data bus;

said test generation logic means (40) being coupled to receive said read signal and a chip select signal for generating a test read signal and a test direction signal;

said direction latch means (39) being coupled to receive said test read signal for storing data direction information;

I/O driver means being coupled to receive said test direction signal for setting the data direction in said bidirectional data bus based upon the direction information stored in said directional latch means (39);

said test generation logic means (40) being coupled to receive a second read signal for generating a test activation signal; and said test interface logic means (24) being coupled to receive said test activation signal for generating internal test signals for the selected functional blocks.

2. A modular test structure as claimed in claim 1, further comprising means for interrupting temporarily the testing of the selected functional block so as to allow reading and/or writing of all internal registers in other functional blocks and in the functional block being tested.

3. A modular test structure as claimed in claim 1, wherein said test generation logic means (40) includes a test generation latch which permits the generation of the test register enable signal and the test activation signal.

4. A modular test structure as claimed in claim 1, wherein said test interface logic means (24) includes a register (41) for receiving and storing said test information.

5. A modular test structure as claimed in claim 4, wherein said test register (41) is formed of a plurality of latches (L0 . . . L7).

6. A modular test structure as claimed in claim 4, wherein said test interface logic means (24) further includes decoding means (ND101 . . . ND106) coupled to outputs of said test register (41) for generating decoded signals.

7. A modular test structure as claimed in claim 6, wherein said test interface logic means (24) further includes logic means (ND401 . . . ND406) which is responsive to the decoded signals and the test activation signal for generating said internal test signals.

8. A modular test structure as claimed in claim 7, wherein said test interface logic means (24) further comprises direction driver means for transmitting the direction information to said direction latches (39).

9. A modular test structure as claimed in claim 8, wherein said direction driver means comprises a set of control transistors (T1–T6) operatively connected to said decoded signals for determining the direction information.

* * * * *